T. ROBJOHN

Machine for Making Band-Ruffles.

No. 6,687. Reissued Oct. 5, 1875.

Witnesses.

Le R. Latimer.

W. J. Pratt.

Inventor.

George H. Mosler, Assignee of Thomas Robjohn per Crosby & Gregory Atty's.

N. PETERS, PHOTO-LITHOGRAPHER, WASHINGTON, D. C.

BEST AVAILABLE COPY

UNITED STATES PATENT OFFICE.

GEORGE H. WOOSTER, OF NEW YORK, N. Y., ASSIGNEE, BY MESNE ASSIGNMENTS, OF THOMAS ROBJOHN.

IMPROVEMENT IN MACHINES FOR MAKING BAND-RUFFLES.

Specification forming part of Letters Patent No. 39,779, dated September 1, 1863; reissue No. 6,687, dated October 5, 1875; application filed August 30, 1875.

DIVISION B.

*To all whom it may concern:*

Be it known that THOMAS ROBJOHN, of the city, county, and State of New York, invented a new and Improved Mechanism for Manufacturing a Band-Ruffle, whereof the following is a full, clear, and exact description, reference being had to the accompanying drawings forming part of this specification, in which—

Figure 5:
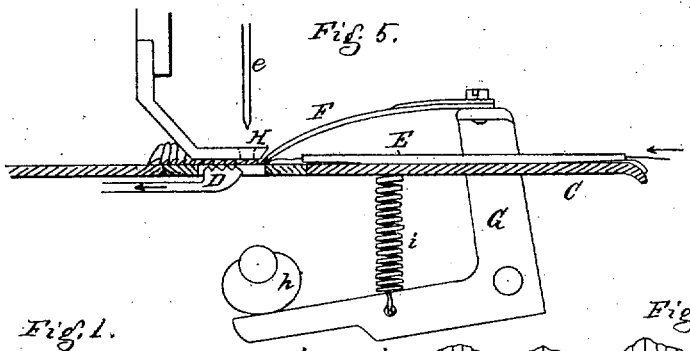
Figure 1:
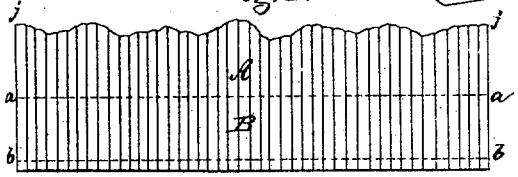
Figure 2:
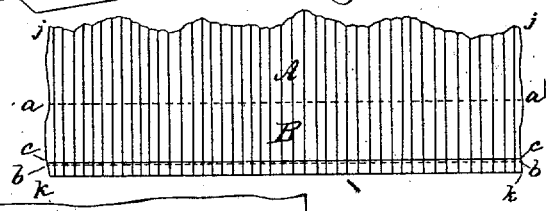
Figure 6:
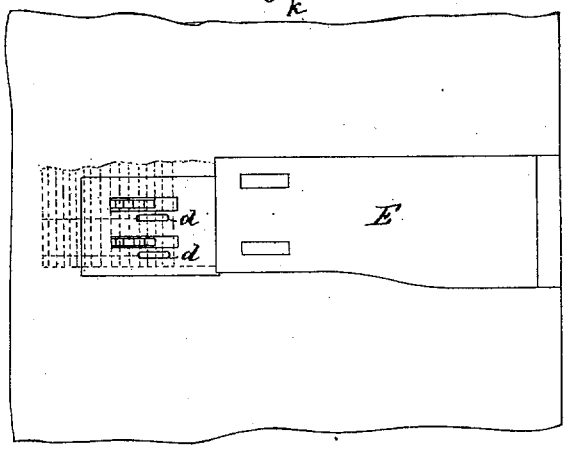
Figure 3:
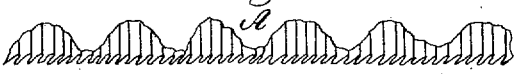
Figure 4:
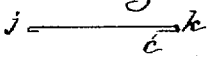
Figure 7:
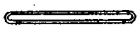
Figure 8:
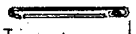

Figure 1 is a face view of a piece of the ruffle. Fig. 2 is a back view of the same. Fig. 3 is a view of the same looking toward the edge of the band. Fig. 4 is a transverse section of the strip of muslin or other material of which the band-ruffle is composed, illustrating one stage of the manufacture. Fig. 5 is a side view of certain attachments to a sewing-machine for making the band-ruffle. Fig. 6 is a plan of certain of the parts represented in Fig. 5. Figs. 7 and 8 are transverse sections of the guide and folder which prepare the strip of muslin or other material for the ruffling or plaiting operation.

Similar letters of reference indicate corresponding parts in the several figures.

This invention consists in mechanism adapted to manufacture a band-ruffle from a single strip of plaited or gathered muslin or other material, which is made to produce both the ruffle or frill and the band by stitching through the plaits or gathers with two rows of stitches, one of which is also made to secure an edge of the material, which is turned in to give a finish to the edge of the band.

A, Figs. 1, 2, and 3, is the ruffle or frill, and B the band. *a* is one row of stitching, which separates or forms the line of demarkation between the band and the ruffle or frill, and *b* is the other row of stitching, which secures together the portions of the plaits which form the band, near the edge thereof, and at the same time secures the turned-in edge *c*, Fig. 2, of the cloth at the edge of the band.

The mechanism for manufacturing this band consists of a sewing-machine furnished with two needles and the necessary appurtenances for producing simultaneously two rows of stitching, and attached to this machine is a folder for turning in the edge *c* of the band, and a plaiting-knife for plaiting the strip after the edge *c* has been turned in, the said folder and plaiting-knife operating on the strip as it is drawn toward the needle by means of the feeder of the sewing-machine.

C, Figs. 5 and 6, is the bed-plate of the machine, and *d d*, Fig. 6, are the holes provided in the said plate for the two needles to work through. One of the needles is shown in Fig. 5, indicated by the letter *e;* but it is not considered necessary to represent or describe particularly the mode of operating them, or the means operating in combination with them to produce the stitching, and on this point it is merely stated that the needles operate parallel with each other and simultaneously, and in combination with them, on the under side of the bed-plate, are employed loopers for producing chain-stitches. D is the feeder, constructed and operating in any well-known manner. E is the folder for turning in the edge *c* of the strip, serving also as a gage, and guiding the strip to the plaiting-knife and needles. This folder and gage consists of a tube, the mouth of which is flat in its transverse section, as shown in Fig. 7, and just wide enough for the passage of a strip of muslin or other material of which the band-ruffle is to be made, but which has one side folded or turned under gradually, commencing at some distance from the mouth, till at its opposite end or outlet, it has the transverse sectional form shown in Fig. 8. The other side of the said tube is straight. The strip, in passing through the said tube, has its edge *c* turned under, as shown in Fig. 4. F is the plaiting-knife, attached to a lever, G, which works on a fixed fulcrum, *g*, and derives motion from a cam, *h*, and spring *i*. The knife has a straight edge, which is always transverse to the direction of the feed movement, and this edge is pressed down upon the bed C, or upon the material placed thereon, between the outlet of the guide and folder E and the presser H, either by means of springs or by its being itself made elastic. The movement of the knife is directly toward and from the needle, parallel with the feed movement, and the said movement in the direction of the feed movement commences before but terminates with the feed movement, being sufficiently longer than the latter movement to enable it to gather up the strip as it issues from the guide and folder, and push it in the form of a plait under the presser H, which is beveled, as shown in Fig. 5, to permit the plait to enter easily under it. As soon as the plaits arrive under the presser, the needles descend through them, and they are secured by being stitched in the two lines *a* and *b*, the line of stitching *b* also securing the turned-in edge *c*, and thus the portion between the turn or edge *k* of the fold before described and the line *a* of stitching is formed into a band, while the portion between the line of stitching *a* and the edge *j* is left loose to form the ruffle or frill. The edge *j* is hemmed in another machine before the strip is introduced to the machine by which it is converted into the ruffle.

I claim—

1. In a ruffling or plaiting device, the combination, with the ruffling-knife, of a guide, arranged substantially as described, to guide and deliver the strip to be ruffled, and at the same time turn over the edge of such strip to form a hem for the ruffle, substantially as described.

2. The combination of a ruffling-knife and the supporting-plate of a sewing-machine, provided with openings for two needles, with a guide adapted to turn or hem the edge of the ruffle, and arranged to deliver the strip to be ruffled to receive two rows of stitches, and to form a band between the rows of stitches and a ruffle at one side thereof, substantially as described.

In testimony whereof I have signed my name to this specification in the presence of two subscribing witnesses.

GEO. H. WOOSTER.

Witnesses:
J. V. ROCKWELL,
PHILIP BLOHM.